Figure 1:
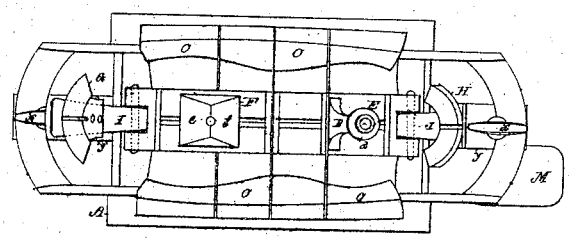
Figure 2:
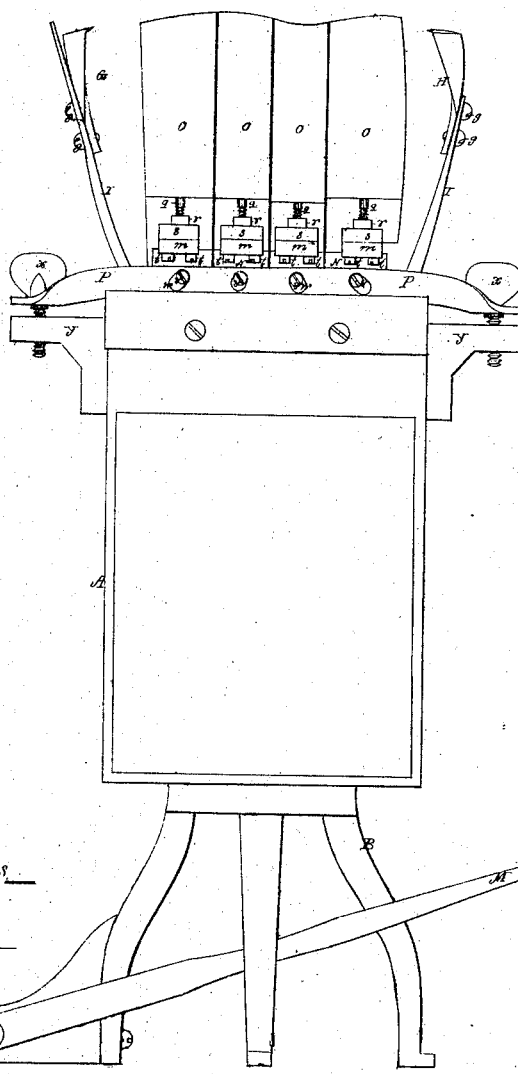
Figure 5:
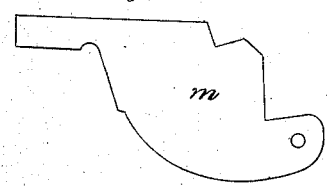
Figure 6:
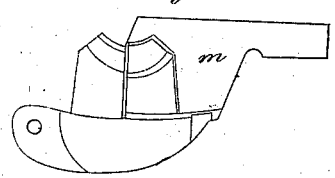
Figure 11:
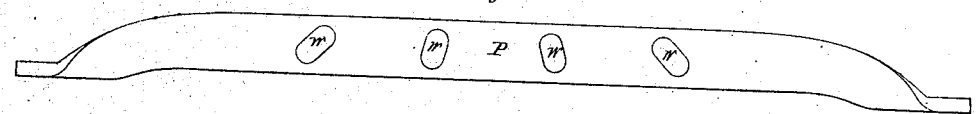
Figure 12:
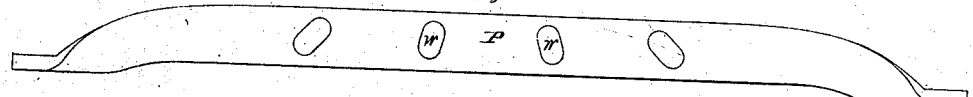
Figure 10:
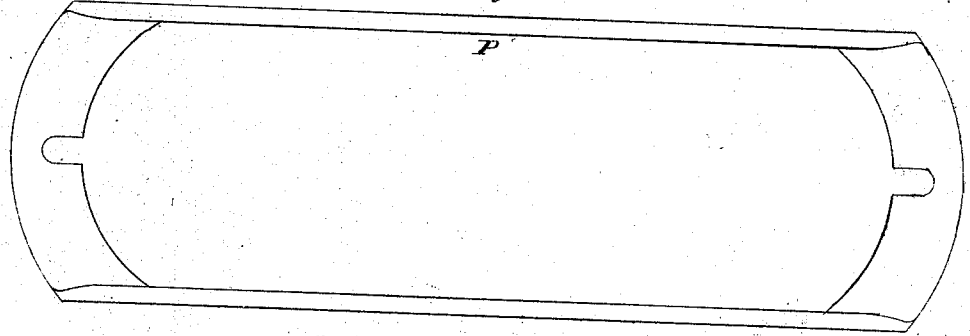
Figure 7:
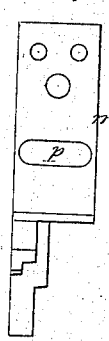
Figure 9:
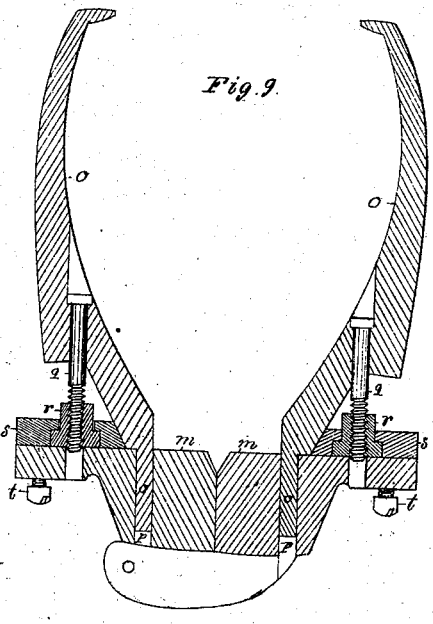
Figure 8:
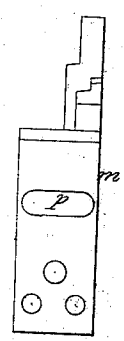

C. H. Trask,

Lasting Shoes.

No. 107,981. Patented Oct. 4, 1870.

Witnesses  
S. N. Piper  
J. K. Snow

C. H. Trask  
by his attorney  
R. H. Eddy

N. PETERS, PHOTO-LITHOGRAPHER, WASHINGTON, D. C.

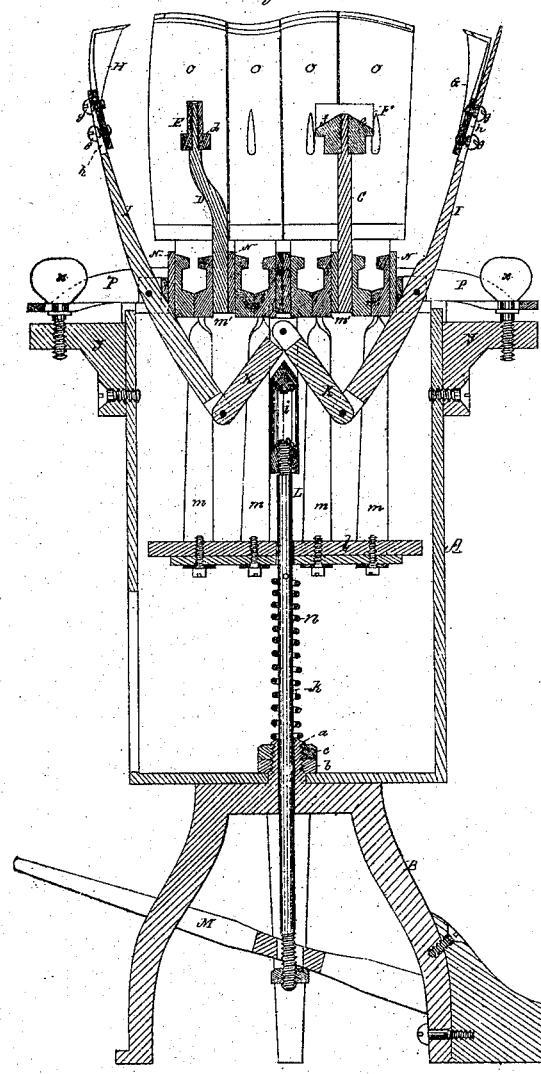
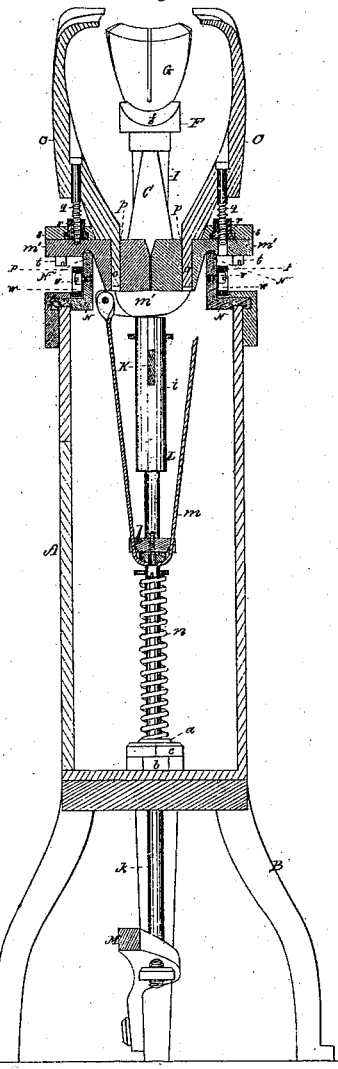

C. H. Trask,
Lasting Shoes.
No. 107,981. Patented Oct. 4, 1870.

Witnesses
S. N. Piper
J. R. Snow

Charles H Trask
by his attorney
R. H. Eddy